(12) United States Patent
Colon-Bonet

(10) Patent No.: US 7,231,414 B1
(45) Date of Patent: Jun. 12, 2007

(54) APPARATUS AND METHOD FOR PERFORMING ADDITION OF PKG RECODED NUMBERS

(75) Inventor: Glenn T Colon-Bonet, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/501,045

(22) Filed: Feb. 9, 2000

(51) Int. Cl.
G06F 7/50 (2006.01)

(52) U.S. Cl. ..................................... 708/700
(58) Field of Classification Search ............... 708/628, 708/630, 700–714, 670; 327/333
See application file for complete search history.

(56) References Cited

U.S. PATENT DOCUMENTS

| | | | | |
|---|---|---|---|---|
| 5,208,490 A | * | 5/1993 | Yetter | 326/98 |
| 5,285,406 A | * | 2/1994 | Lynch et al. | 708/714 |
| 5,357,457 A | * | 10/1994 | Terane | 708/711 |
| 5,389,835 A | * | 2/1995 | Yetter | 326/98 |
| 5,392,423 A | * | 2/1995 | Yetter | 713/503 |
| 5,493,524 A | * | 2/1996 | Guttag et al. | 708/709 |
| 5,600,583 A | * | 2/1997 | Bosshart et al. | 708/525 |
| 5,627,773 A | * | 5/1997 | Wolrich et al. | 708/204 |
| 5,694,350 A | * | 12/1997 | Wolrich et al. | 708/497 |
| 5,706,323 A | * | 1/1998 | Miller | 327/333 |
| 5,719,803 A | * | 2/1998 | Naffziger | 708/710 |
| 5,740,094 A | | 4/1998 | Klim | |
| 5,825,679 A | * | 10/1998 | Wolrich et al. | 708/628 |
| 5,889,692 A | * | 3/1999 | Wolrich et al. | 708/630 |
| 5,933,362 A | * | 8/1999 | Inoue | 708/711 |
| 5,951,630 A | * | 9/1999 | Liu | 708/700 |
| 6,055,557 A | * | 4/2000 | Beck et al. | 708/700 |
| 6,131,107 A | * | 10/2000 | Wolrich et al. | 708/630 |
| 6,175,852 B1 | * | 1/2001 | Dhong et al. | 708/712 |
| 6,237,085 B1 | * | 5/2001 | Burns et al. | 712/223 |
| 6,285,300 B1 | | 9/2001 | Colon-Bonet | |
| 6,446,107 B1 | * | 9/2002 | Knowles | 708/707 |
| 6,496,846 B1 | * | 12/2002 | Bradley | 708/710 |

OTHER PUBLICATIONS

Robert J Martin et al., Dynamic logic with completion detection, Nov. 24, 1993, U.K. Patent Application No. GB 2267191A.*
Taewhan et al., Arithmetic optimization using carry-save-adders, 1998, ACM 35th design automation conference, pp. 1-6.*

* cited by examiner

Primary Examiner—Meng-Al An
Assistant Examiner—Chat C. Do (57) ABSTRACT

An apparatus and method provide an apparatus and method for performing the addition of a PKG recoded number, to reduce noise production and power consumption. In particular, the apparatus is accomplished by a circuitry configured to receive at least two values, a first value and a second PKG value. The apparatus generates a sum value and a carry value. The method is accomplished by receiving a first value and second PKG value, and generating a sum value and a carry value from the first value and second PKG value.

24 Claims, 13 Drawing Sheets

| LOGICAL VALUES | | MOUSETRAP ENCODING | | | | PKG RECODING | | | ACTION |
|---|---|---|---|---|---|---|---|---|---|
| A | B | AH | AL | BH | BL | P | K | G | |
| - | - | 0 | 0 | 0 | 0 | 0 | 0 | 0 | PRECHARGE/NOT READY |
| 0 | 0 | 0 | 1 | 0 | 1 | 0 | 1 | 0 | KILL - CLEAR ALL BITS |
| 0 | 1 | 0 | 1 | 1 | 0 | 1 | 0 | 0 | PROPAGATE - SET 1 BIT |
| 1 | 0 | 1 | 0 | 0 | 1 | 1 | 0 | 0 | PROPAGATE - SET 1 BIT |
| 1 | 1 | 1 | 0 | 1 | 0 | 0 | 0 | 1 | GENERATE - SET 2 BITS |

*FIG. 1*

(PRIOR ART)

FIG. 2A

(PRIOR ART)

| G1 123 | P1 121 | K1 122 | G2 126 | P2 124 | K2 125 | | C2 127 | G 133 | P 131 | K 132 |
|---|---|---|---|---|---|---|---|---|---|---|
| 0 | 0 | 1 | 0 | 0 | 1 | | 0 | 0 | 0 | 1 |
| 0 | 0 | 1 | 0 | 1 | 0 | | 0 | 0 | 1 | 0 |
| 0 | 0 | 1 | 1 | 0 | 0 | | 1 | 0 | 0 | 1 |
| 0 | 1 | 0 | 0 | 0 | 1 | | 0 | 0 | 1 | 0 |
| 0 | 1 | 0 | 0 | 1 | 0 | | 0 | 1 | 0 | 0 |
| 0 | 1 | 0 | 1 | 0 | 0 | | 1 | 0 | 1 | 0 |
| 1 | 0 | 0 | 0 | 0 | 1 | | 1 | 0 | 0 | 1 |
| 1 | 0 | 0 | 0 | 1 | 0 | | 1 | 0 | 1 | 0 |
| 1 | 0 | 0 | 1 | 0 | 0 | | 1 | 0 | 0 | 0 |

…
APPARATUS AND METHOD FOR PERFORMING ADDITION OF PKG RECODED NUMBERS

BACKGROUND OF THE INVENTION

1. Technical Field

The present invention generally relates to an apparatus for performing arithmetic operations, and more particularly, to reducing noise production and power consumption by performing the addition of PKG recoded numbers.

2. Description of Related Art

Generally, traditional dual-rail encoding (i.e. mousetrap logic) is often implemented in arithmetic circuitry. Dual-rail encoding requires that multiple wires be enabled to indicate the proper value. For power and noise reasons, it is desirable to reduce the number of wires routed over an integrated circuit and the switching activity of these wires. Therefore, PKG recoding can be implemented to reduce the number of wires and the switching activity of these wires.

Figure 1:
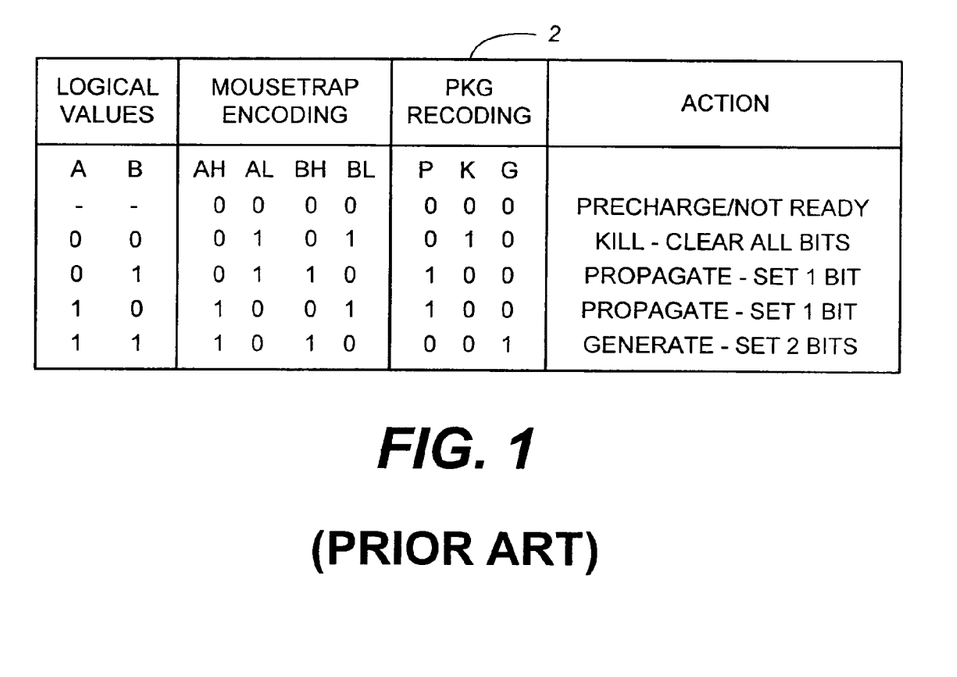
FIG. 1 is a table illustrating a PKG encoding method that reduces switching activity of lines by 50% over traditional domino encoding.

Illustrated in FIG. 1 is a recoding table 2 illustrating the encoding of two logical values into mousetrap logic. The mousetrap logic values are then encoded into PKG recoding values to reduce the number of wires routed over an integrated circuit from 4 wires to 3 wires. There is also a large savings in the switching activity of these wires. The switching activity is reduced from 2 of 4 wires switched to 1 of 3 wires switched, as shown by recoding table 2. These reductions cause the significant savings of cutting power consumption by 50% and the area for wiring by 25%.

Figure 2A:
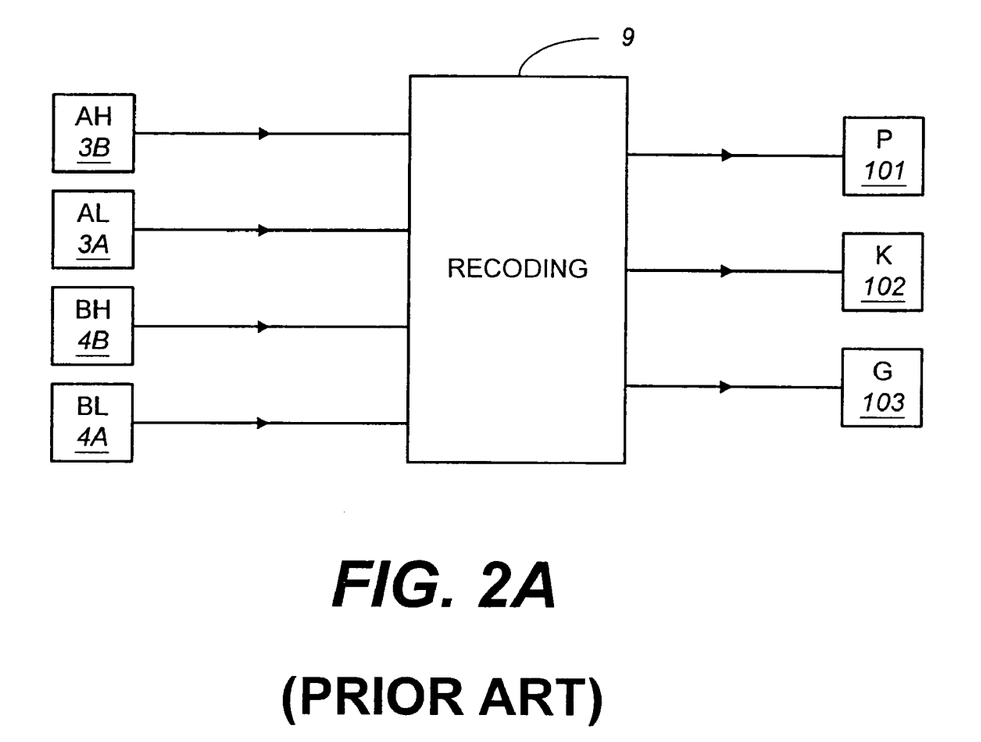
FIG. 2A is a block diagram illustrating the encoding circuit for PKG recoding.

Illustrated in FIG. 2A is a block diagram representing the dual rail pairs of signals for values A 3(A&B) and B 4(A&B) being recoded into PKG signals (101–103) by recoding device 9.

Figure 2B:
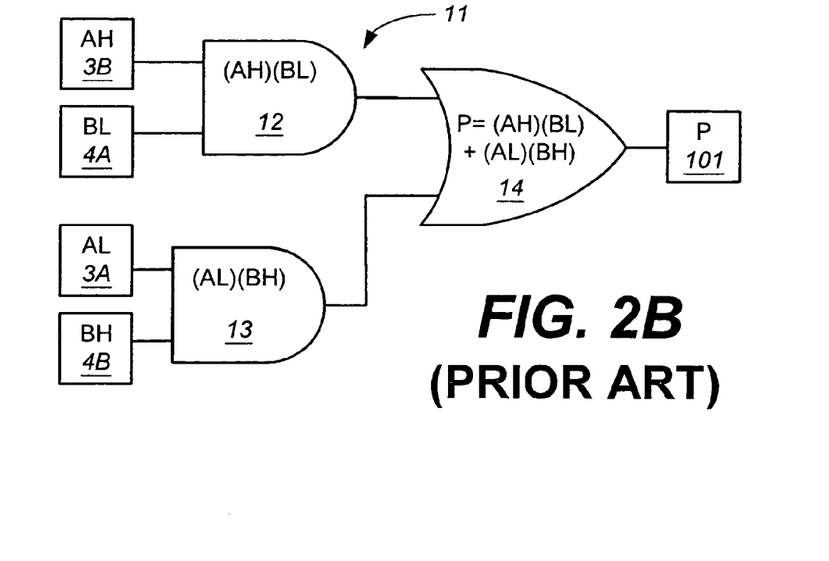
FIG. 2B is a block diagram illustrating a mousetrap logic encoding circuit for P-propagate code in a PKG recoding.

Illustrated in FIG. 2B is a block diagram of a possible example of a mousetrap logic encoding circuit 11 for P-propagate code in a PKG recoding. As shown in FIG. 2B, the propagate code 101 is generated from the mousetrap encoding by taking the logical "AND" operation of the high A 3B mousetrap encoded signal and the low B 4A mousetrap encoded signal in the "AND" logic 12. The output from the "AND" logic 12, is one input into the "OR" logic 14. The logical "AND" of the low A 3A mousetrap encoded sign and the high B 4B mousetrap encoded signal is performed in the "ADD" logic 13, and is input as the second input into "OR" gate 14. The final logical operation utilizing the "OR" 14 produces the P-propagate code 101 that is equal to the logical end of the A high 3B and B low 4A, or the A low 3A and B high 4B signals.

Figure 2C:
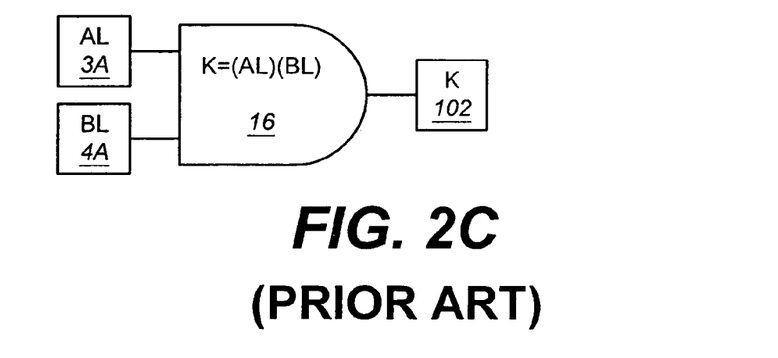
FIG. 2C is a block diagram illustrating a mousetrap logic encoding circuit for K-kill code in a PKG recoding.

Illustrated in FIG. 2C is a block diagram of a possible example of a mousetrap logic encoding circuit 16 for K-kill code 102 in PKG recoding. The kill or clear all bits code in the PKG recoding is represented by a logical "AND" of the A low 3A and B low 4A mousetrap encoding bits. If both the A low 3A and B low 4A bits are enabled, the PKG recoding generates a K code 102, indicating the clearing of both logical bits A 4 and B 5.

Figure 2D:
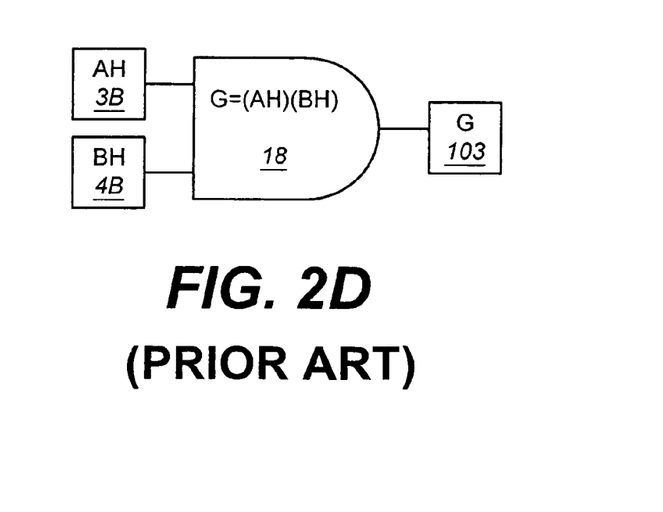
FIG. 2D is a block diagram illustrating a mousetrap logic encoding circuit for the G-generate code in a PKG recoding.

Illustrated in FIG. 2D is a block diagram of a possible example of a mousetrap logic encoding circuit 18 for the G-generate code 103 in PKG recoding. The G-generate code 103 in PKG recoding, is constructed utilizing a logical end of the A high 3B and B high 4B bits in mousetrap encoding. If the A high 3B and B high 4B bits are enabled, the PKG recoding will generate a G code 103 that indicates the setting of both bits.

While using PKG recoded signals can reduce the number of wires needed to represent two values, it does cause the problem of how to add numbers in this PKG recoded form. Thus, a heretofore-unaddressed need exists in the industry to address the aforementioned deficiencies and inadequacies.

SUMMARY OF THE INVENTION

The present invention provides an apparatus and method for performing the addition of PKG recoded numbers.

Briefly described, in architecture, the system can be implemented as follows. An apparatus is configured to receive a first value and a second PKG value, and generating a sum value and a carry value from the first value and second PKG value.

The present invention can also be viewed as providing a method for reducing noise production and power consumption by performing the addition of PKG recoded numbers. In this regard, the method can be broadly summarized by the following steps: (1) receiving a first value and second PKG value, and (2) generating a sum value and a carry value from the first value and second PKG value.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 3A:
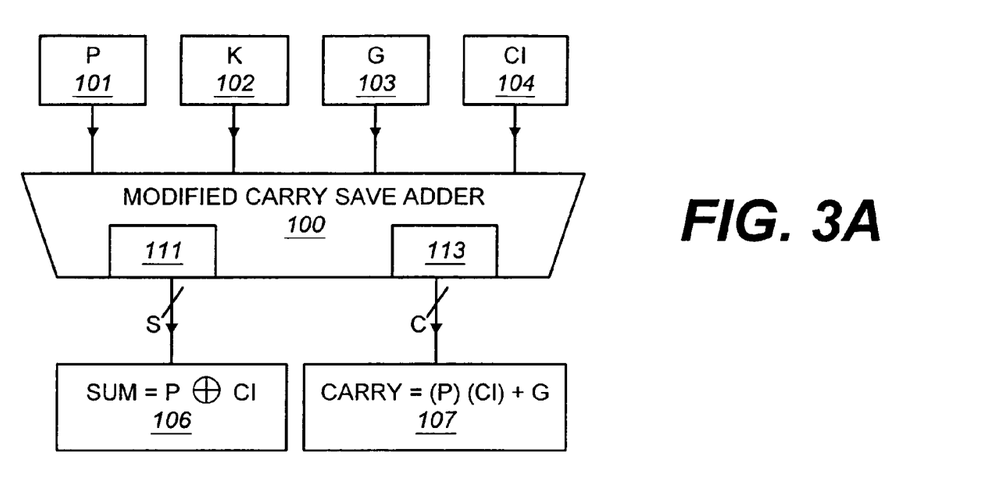
FIG. 3A is block diagram of an example of a carry save adder of the present invention, for performing addition on a newly encoded PKG input and a traditional binary bit.

Illustrated in FIG. 3A is a block diagram of a possible example of a carry save adder 100 redesigned for performing addition on a newly encoded Propagate-Kill-Generate (PKG) input and a traditional binary bit. A PKG input is provided by a PKG recoding operation that involves recoding logic values. As mentioned before, illustrated in FIG. 1 is a recoding table 2 illustrating the encoding of two logical values into mousetrap logic. The mousetrap logic values are then encoded into PKG recoding values to reduce the number of wires routed over an integrated circuit from four wires to three wires. As can be seen in FIG. 3A, the P 101, K 102 and G 103 signals are received by the modified carry save adder 100. The P 101, K 102 and G 103 signals are input along with carry-in signal CI 104, representing one traditional binary bit carry-in number.

The signals are processed by the modified carry save adder 100 and output is generated as sum 106 and carry 107 signals. The sum 106 signal is representative of an exclusive "OR" between the P 101 propagate signal and the carry-in signal CI 104. The logic circuit to generate the sum signal 106 is herein defined in further detail with regard to FIG. 3B.

The carry signal is generated from a logical "AND"ing of the P 101 and carry-in CI 104 signals. This added combination of carry-in CI 104 and P 101, is then "OR"ed with the G 103 signal to generate the carry signal 107. The logic circuit to generate the carry signal 107 is herein defined in further detail with regard to FIG. 3C.

Figure 3B:
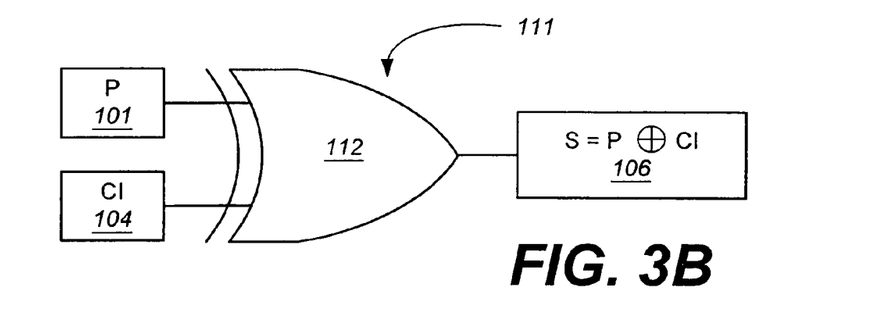
FIG. 3B is a block diagram of an example of a circuit to generate the sum output of the redesigned carry save adder of the present invention as shown in FIG. 3A.

Illustrated in FIG. 3B is a block diagram of a possible example of a sum output generation circuit 111 to generate the sum signal 106, of the redesigned carry save adder 100 of the present invention, as shown in FIG. 3A. Shown in FIG. 3B, the carry-in signal CI 104 is exclusively "OR"ed with the P signal 101 using the logical exclusive "OR" circuit 112 to generate the sum signal 106, as shown in FIG. 3A.

Figure 3C:
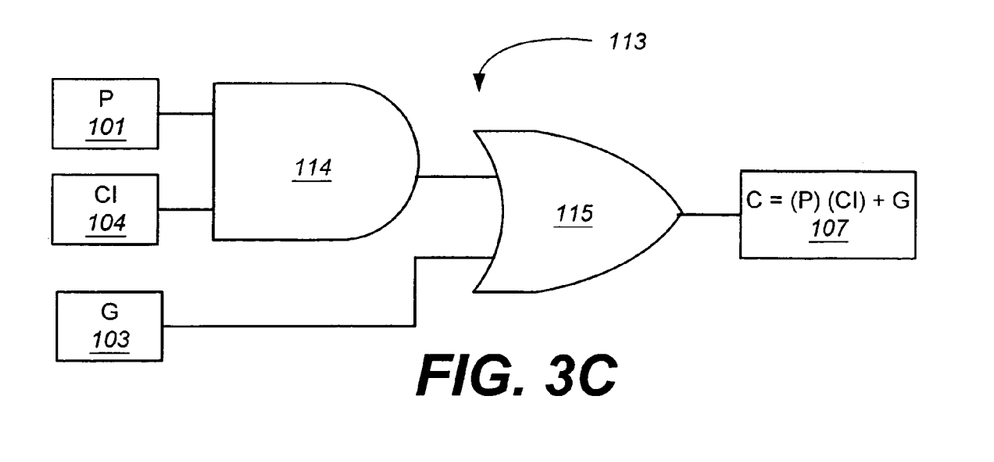
FIG. 3C is a block diagram of an example of a circuit for generating the carry output of the redesigned carry save adder of the present invention as shown in FIG. 3A.

Illustrated in FIG. 3C is a block diagram of a possible example of a carry output generation circuit 113 for generating the carry signal 107 of the redesigned carry save adder 100 of the present invention, as shown in FIG. 3A. As shown, the carry-in signal CI 104 and the P signal 101 are added together in logical "AND" gate 114. The output of the logical "AND" gate 114 is input into the logical "OR" gate 115. Also input into the logical "OR" gate 115, is the G signal 103. The output of a logical "OR" gate 115 is the carry signal 107, as shown in FIG. 3A.

Figure 4:
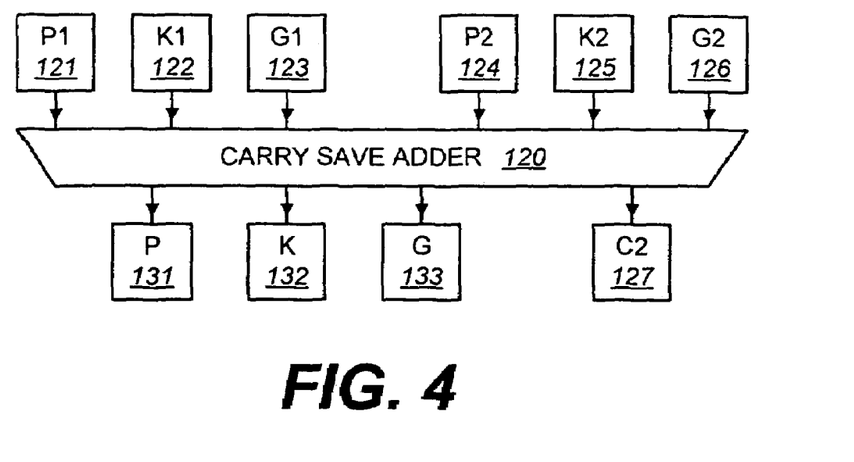
FIG. 4 is a block diagram of an example of a redesigned carry save adder of the present invention, for adding two PKG recoded numbers.

Illustrated in FIG. 4 is a block diagram of a modified carry save adder 120 for adding two PKG recoded numbers. The two number PKG carry save adder 120, adds two numbers in PKG form and produces a PKG number with a traditional binary bit carry-out signal. The first PKG recoded number 121–123 is input into the carry save adder 120. The second PKG number 124–126 is also input into the carry save adder 120. The carry save adder generates an output PKG signal 101–103 from the pair of PKG recoded numbers. Also generated is a traditional binary bit carry-out signal C2 127.

Figure 5:
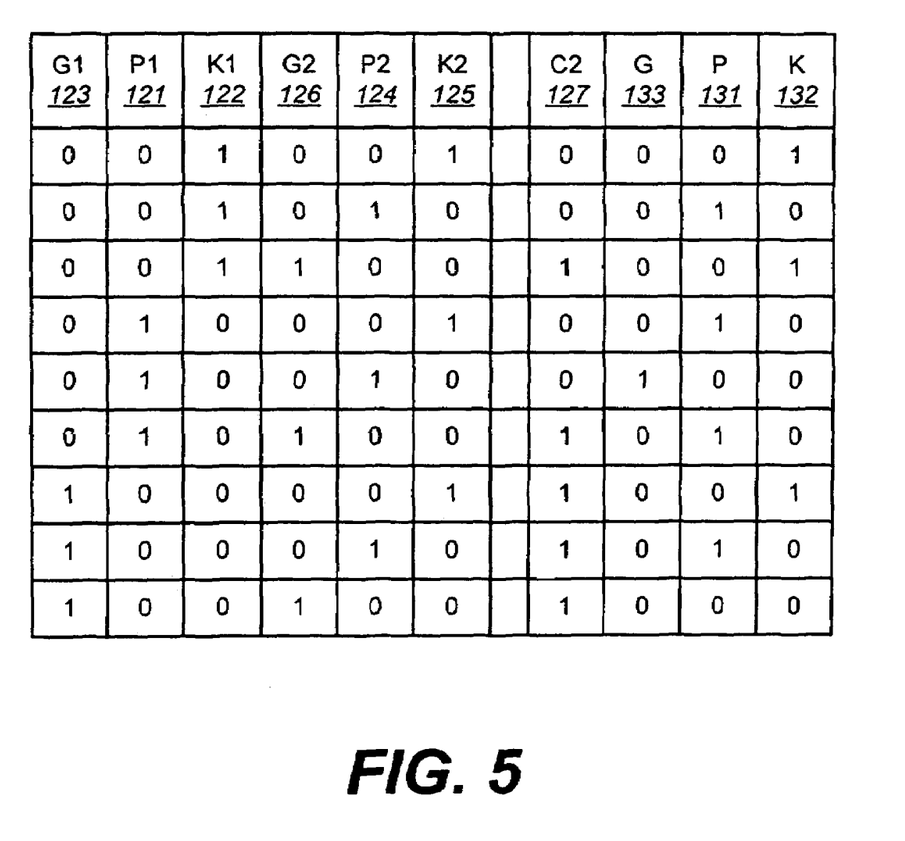
FIG. 5 is a table illustrating an example of PKG encoding signals for two PKG recoded numbers.

Illustrated in FIG. 5, is a table 140 explaining by one example, signals generated by the addition of two PKG encoding signals. As shown, table 140 defines the various input (121–126) and output values (127 & 131–133). The output values (127 & 131–133) are generated by the PKG adding circuit of the present invention, by adding two PKG recoded numbers (121–123) and (124–126). The PKG adding circuit for adding two PKG recoded numbers is herein defined in greater detail with regard to FIG. 6.

Figure 6:
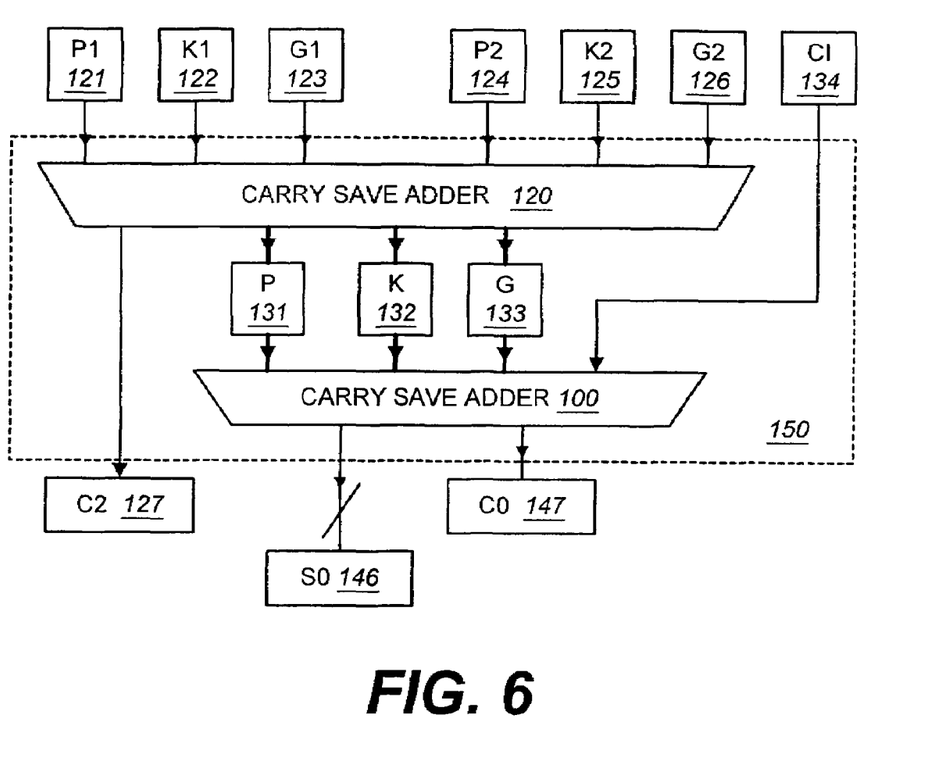
FIG. 6 is a block diagram of an example of an adder of the present invention, for adding two PKG recoded numbers.

The formulas described below are utilized by the PKG adding circuit of the present invention, to generate the desired output values from the two PKG recoded numbers P1, K1 & G1 (121–123) and P2, K2 & G2 (124–126), are as follows.

$$P = P1 \cdot (K2 + G2) + P2 \cdot (K1 + G1)$$

$$K = (K1 \cdot K2) + (K1 \cdot G2) + (K2 \cdot G1)$$

$$G = (P1 \cdot P2) + (G1 \cdot G2)$$

$$C2 = G1 + G2$$

$$\overline{C2} = (K1 + P1) \cdot (K2 + P2)$$

Illustrated in FIG. 6 is a block diagram of the PKG adding circuit 150 of the present invention, for adding two PKG recoded numbers. The PKG adding circuit 150 adds two numbers in PKG form by utilizing the carry save adder 100 and carry save adder 120 in series. The carry save adder 100 and carry save adder 120, were previously defined with regard to FIGS. 3A and 4.

As can be seen, the addition of two numbers in PKG form is broken into two parts, the first part being the input of the two PKG recoded numbers P1, K1 & G1 (121–123) and P2, K2 & G2 (124–126). The carry save adder 120 generates the PKG signals 131–133 and carry output 127. The PKG signals 131–133 are input into carry save adder 100 along with the carry-input signal 134 from a previous addition. The carry save adder 100 adds the signals and generates a dual rail encoded sum output 146 and carry output 147 signals.

Figure 7:
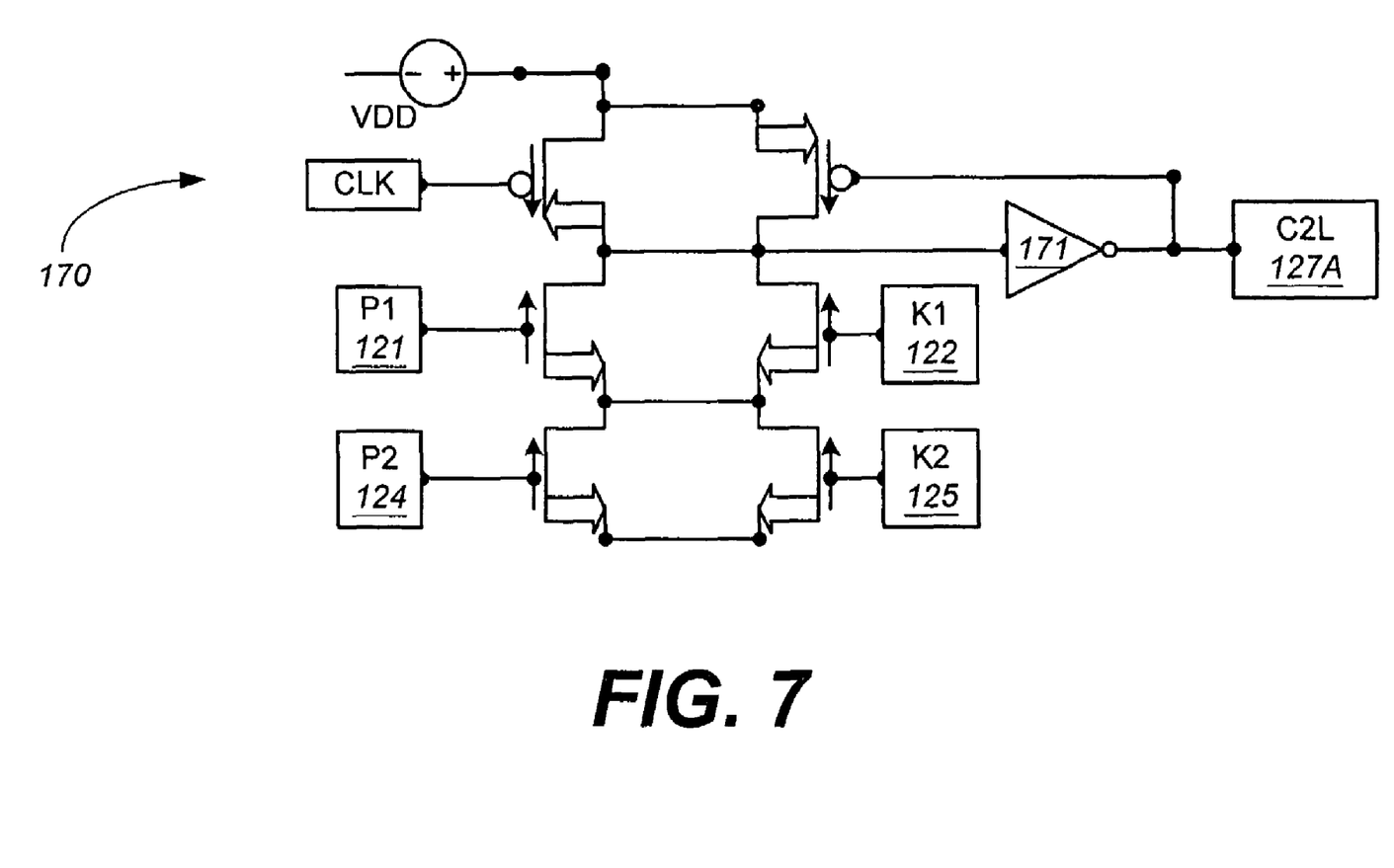
FIG. 7 is a schematic of a possible example of a two PKG recoded number adder circuit, generating the carry out low signals of the present invention.

Illustrated in FIG. 7 is a circuit schematic of a portion of a possible example of the PKG adding circuit 150, of the present invention. Shown, is the portion of the two PKG recoded number carry save adder 120, that generates the dual-rail carry-out low (C2L) 127A signal. The dual-rail carry-out low (C2L) 127A signal, is utilized in the example PKG adding circuit 150 of the present invention, for adding two PKG recoded numbers.

Figure 8:
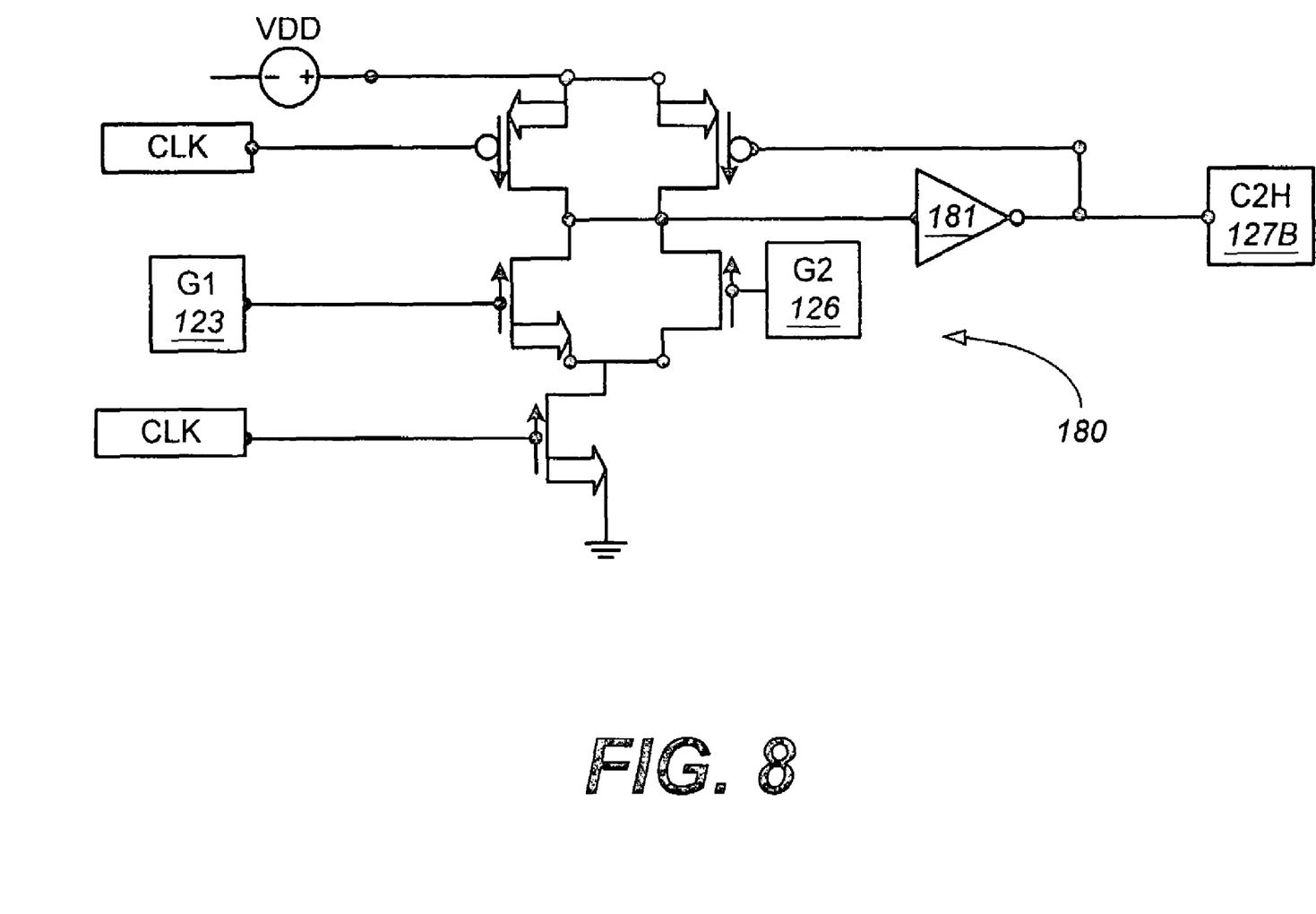
FIG. 8 is a schematic of a possible example of a two PKG recoded number adder circuit, for generating the carry out high signal of the present invention.

Illustrated in FIG. 8 is a circuit schematic of a portion of a possible example of the PKG adding circuit 150, of the present invention. Shown, is the portion of the two PKG recoded number carry save adder 120, that generates the dual-rail carry-out high (C2H) 127B signal. The dual-rail carry-out high signal (C2H) 127B signal is utilized in the example PKG adding circuit 150, of the present invention, for adding two PKG recoded numbers.

Figure 9:
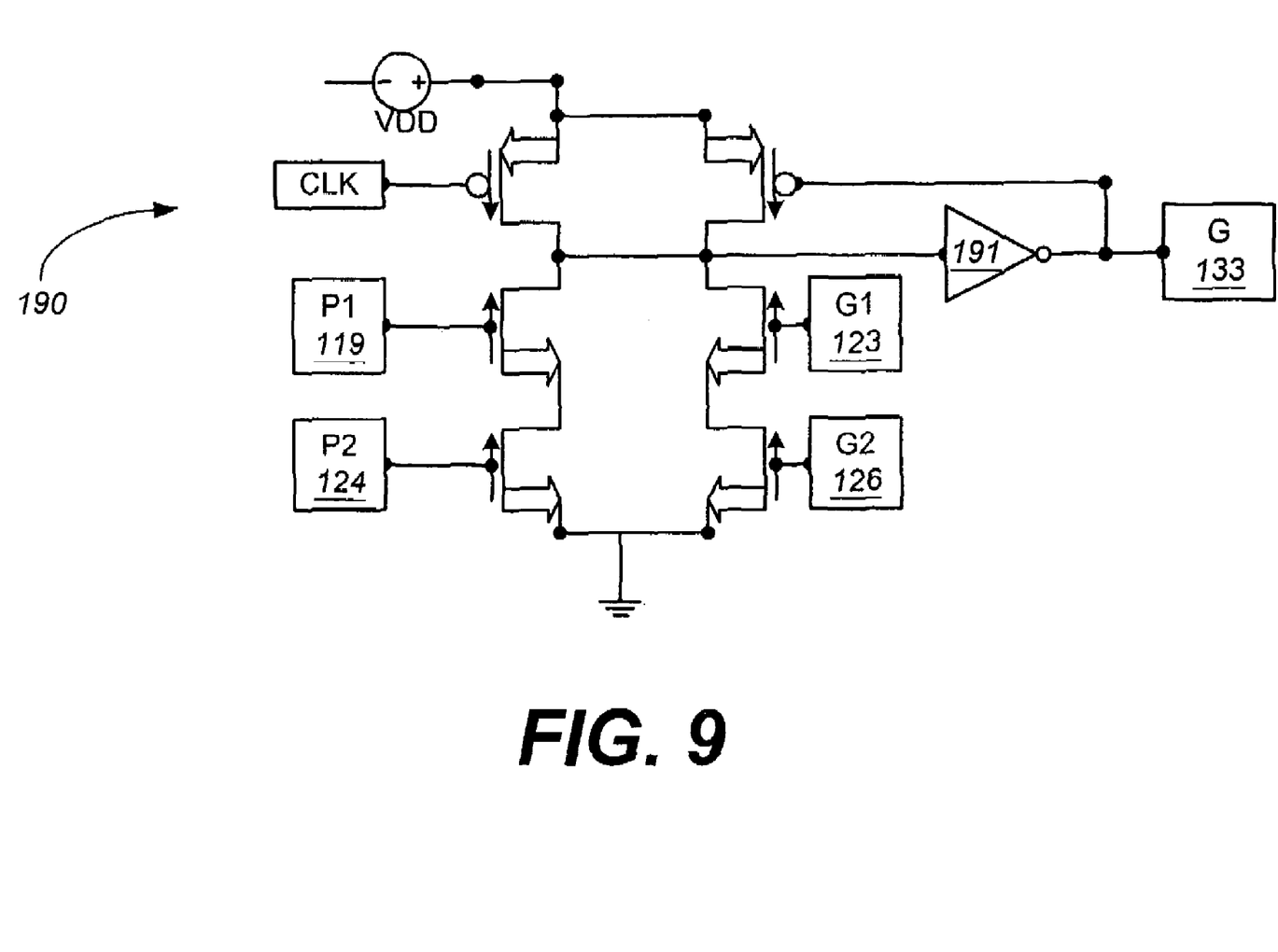
FIG. 9 is a schematic of a possible example of a two PKG recoded number adder circuit, for generating the G signal output of the present invention.

Illustrated in FIG. 9 is a circuit schematic of a portion of a possible example of the PKG adding circuit 150, of the present invention. Shown, is the portion of the two PKG recoded number carry save adder 120, that generates the PKG G 133 signal. The PKG G 133 signal is utilized in the example PKG adding circuit 150, of the present invention, for adding two PKG recoded numbers.

Figure 10:
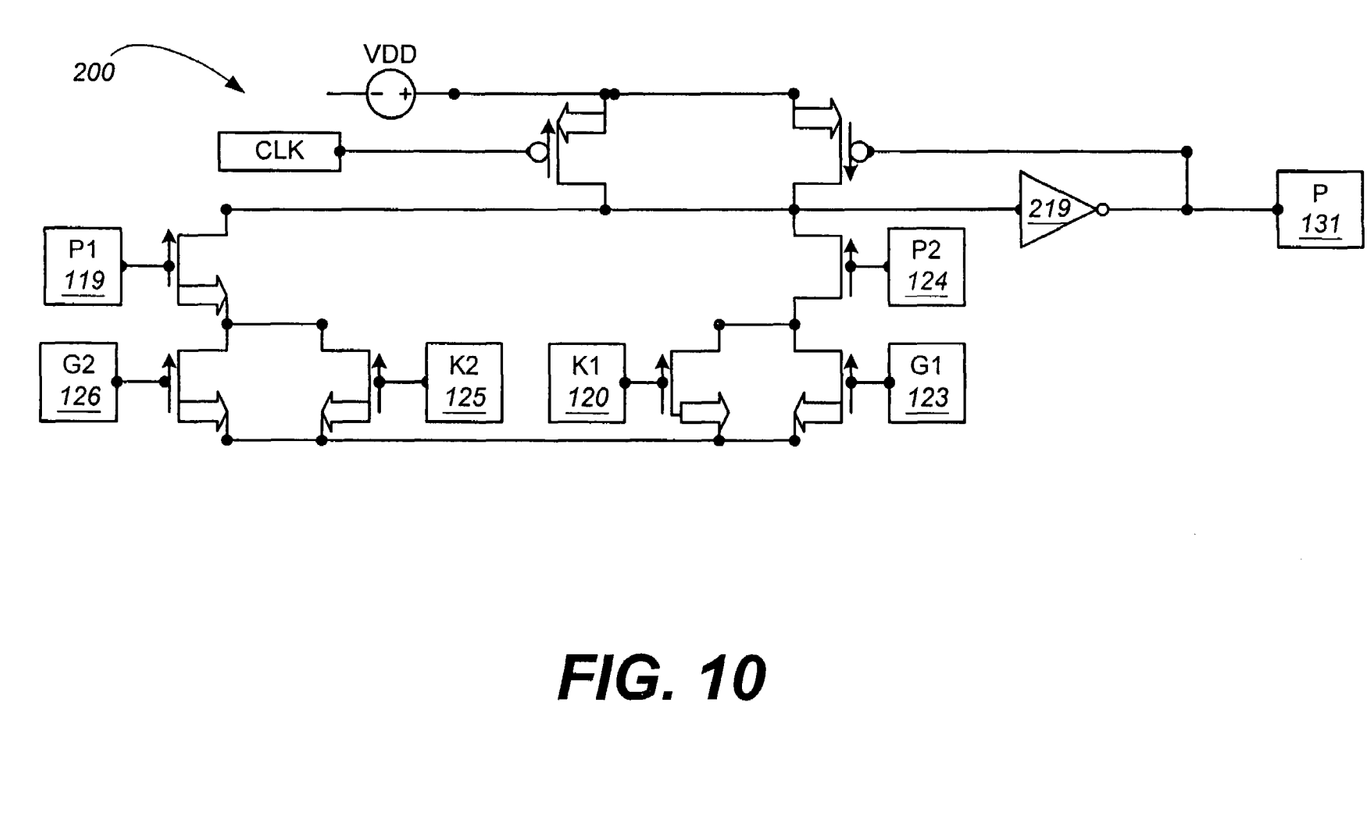
FIG. 10 is a schematic of a possible example of a two PKG recoded number adder circuit of the present invention, for generating a P signal output.

Illustrated in FIG. 10 is a circuit schematic of a portion of a possible example of the PKG adding circuit 150, of the present invention. Shown, is the portion of the two PKG recoded number carry save adder 120, that generates the PKG P 131 output signal. The PKG P 131 signal is utilized in the example PKG adding circuit 150, of the present invention, for adding two PKG recoded numbers.

Figure 11:
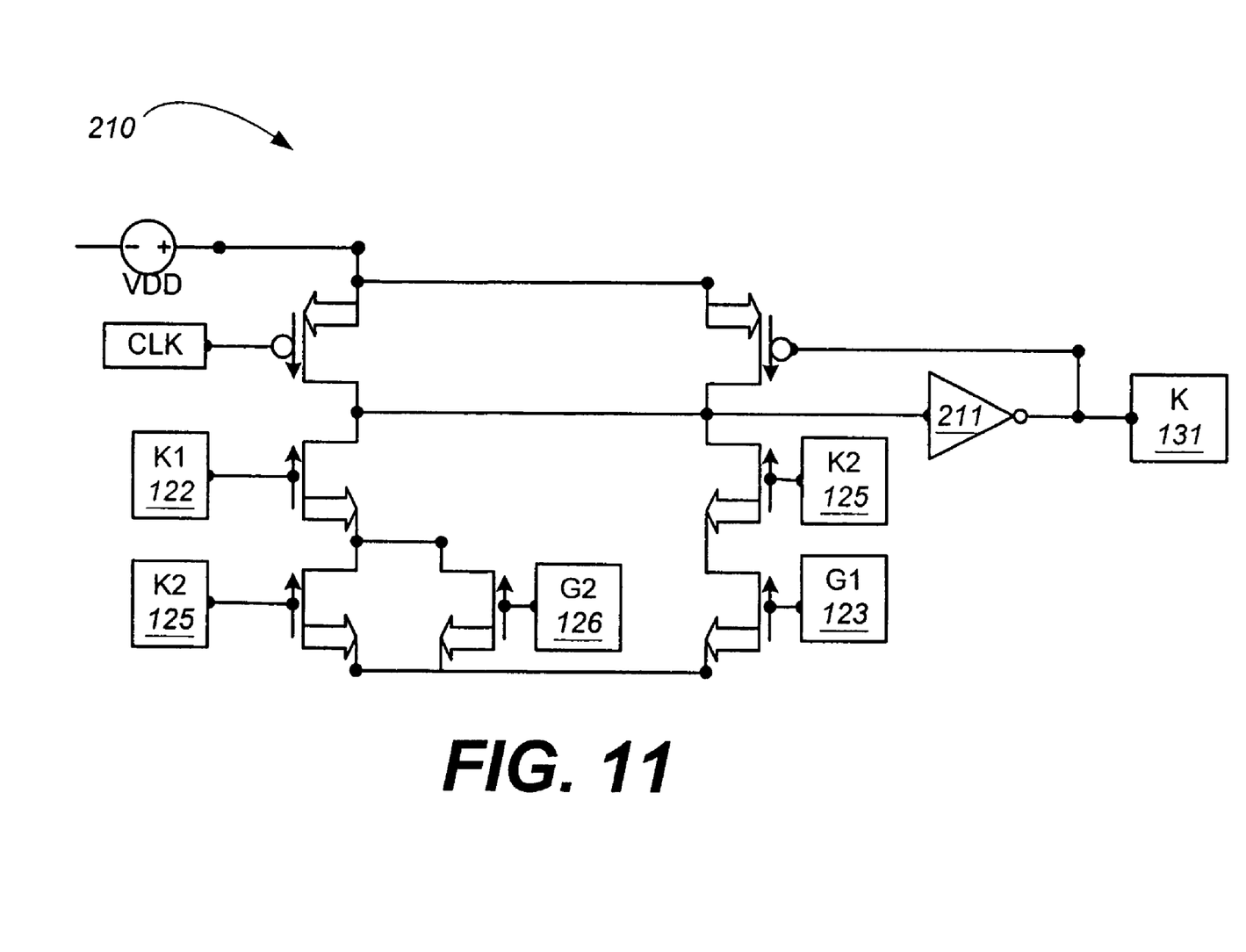
FIG. 11 is a schematic of a possible example of a two PKG recoded number adder circuit of the present invention for generating the K signal output.

Illustrated in FIG. 11 is a circuit schematic of a portion of a possible example of the PKG adding circuit 150, of the present invention. Shown, is the portion of the two PKG recoded number carry save adder 120, with the example PKG adding circuit 150 that generates the PKG K 132 signal. The PKG K 132 signal is utilized in example PKG adding circuit 150, of the present invention, for adding two PKG recoded numbers.

Figure 12:
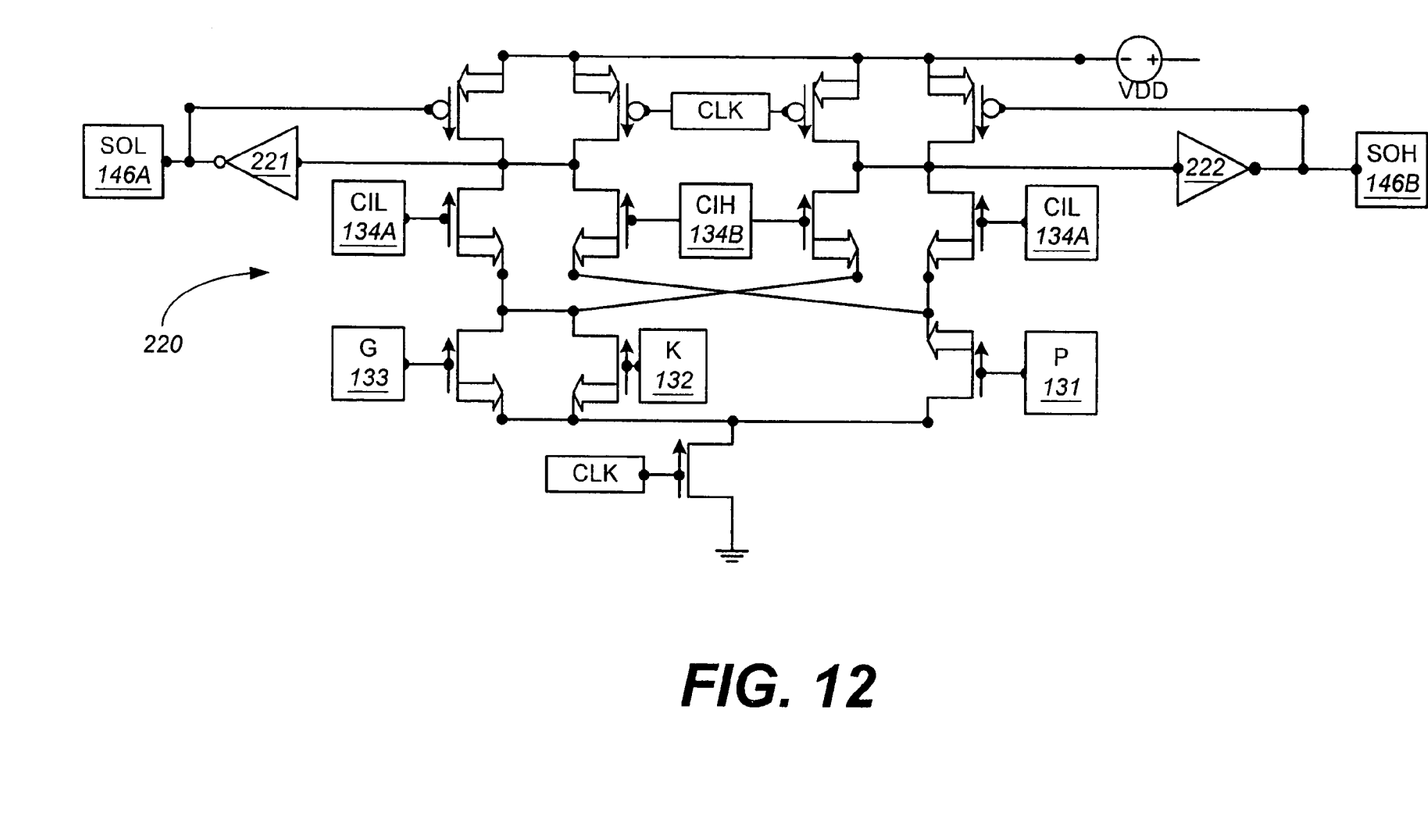
FIG. 12 is a schematic of a possible example of a PKG recoded carry save adder of the present invention for generating the sum high and sum low signals.

Illustrated in FIG. 12 is a circuit schematic of a portion of a possible example of the PKG adding circuit 150, of the present invention. Shown, is the portion of the possible example of a PKG carry save adder 100 circuit (FIG. 3A). This schematic of a possible example of a PKG carry save adder 100 circuit (FIG. 3A), is used for generating the dual-rail sum low (SOL) 146A and high (SOH) 146B signals in the possible example of the PKG adding circuit 150 (FIG. 4), of the present invention. The inputs P 131, K 132, G 133 and CIL 134 (A &B) are obtained from the output of an example two PKG recoded numbers PKG carry save adder 120, illustrated by functional circuit (FIG. 4) and schematics (FIGS. 7–11).

Figure 13:
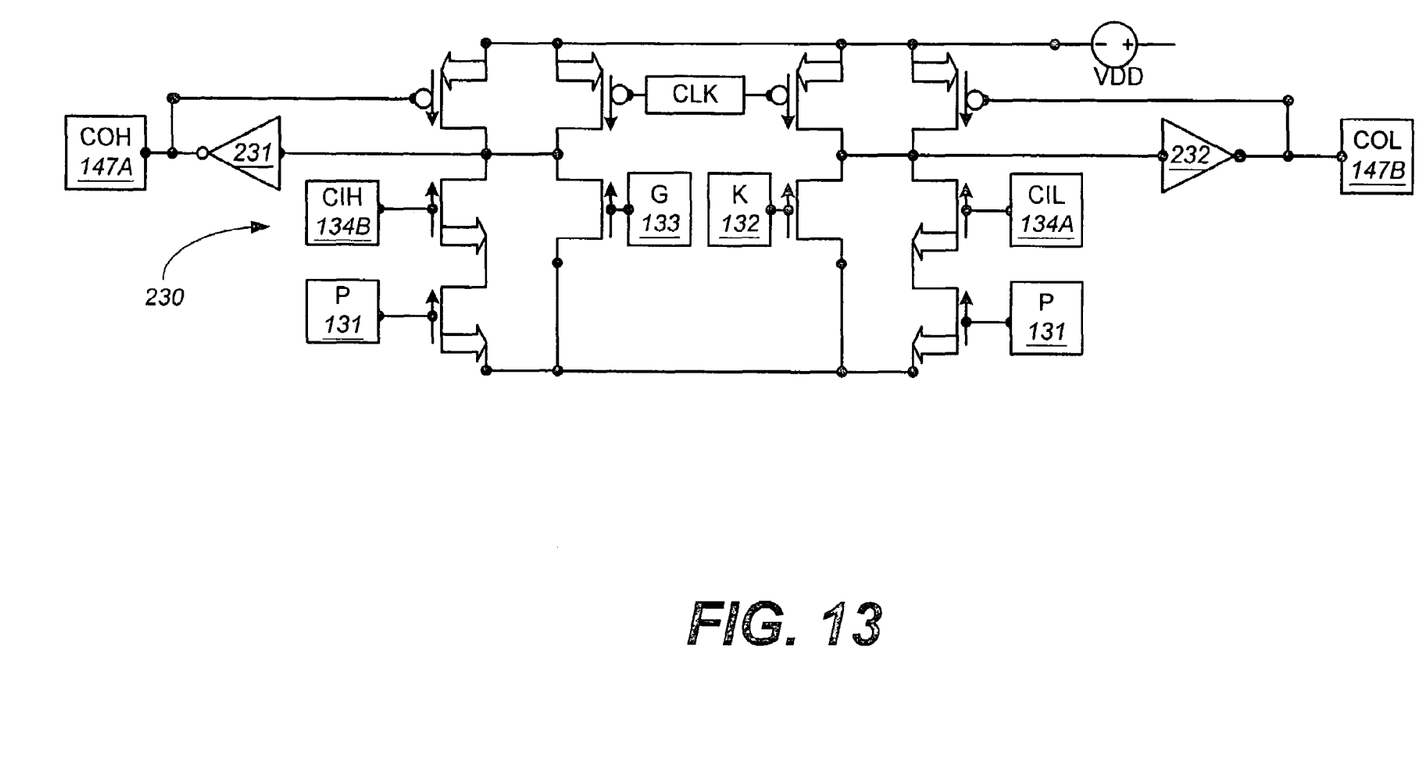
FIG. 13 is a schematic of a possible example of a PKG recoded carry save adder of the present invention for generating the carry high and carry low signals.

Illustrated in FIG. 13 is a circuit schematic of a portion of a possible example of the PKG adding circuit 150, of the present invention. Shown, is the portion of the possible example of a PKG carry save adder 100 circuit (FIG. 3A). This schematic of a possible example of a PKG carry save adder 100 circuit (FIG. 3A), is used for generating the dual-rail carry-out low (COL) 147A and high (COH) 147B signals in the possible example of the PKG adding circuit 150 (FIG. 4), of the present invention. The inputs P 131, K 132, G 133 and CIL 134 (A &B) are obtained from the output of two PKG recoded numbers PKG carry save adder 120, illustrated by functional circuit (FIG. 4) and schematics (FIGS. 7–11).

Certainly a designer of ordinary skill in the art could produce a gating cell similar to those shown in FIGS. 7–13 to implement the example PKG adding circuit 150 of the present invention.

The block diagrams of FIGS. 2(A–D)–4 and 6–13 show the architecture, functionality, and operation of a possible implementation of the system architecture to increase the performance of PKG carry save adder operations. In this regard, each block represents a module, device, or logic. It should also be noted that in some alternative implementations, the functions noted in the blocks might occur out of the order. For example, two blocks may in fact be executed substantially concurrently, depending upon the functionality involved.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

The invention claimed is:

1. An apparatus for performing addition of propagate, kill, and generate recoded numbers, said apparatus comprising:
   circuitry configured to receive at least a first operand, a second operand, and a carry-in bit, the first and second operands comprising respective first and second propagate, kill, and generate recoded number representations of respective first and second binary operands;
   a first carry-save adder configured to add said first operand and said second operand to generate a third propagate, kill, and generate recoded number representation and a carry-out bit; and
   a modified carry-save adder configured to receive the third propagate, kill, and generate recoded number representation from the first carry-save adder and the carry-in bit from the circuitry, add the separate propagate, kill, and generate bits of the third propagate, kill, and generate recoded number representation with the carry-in bit to generate a sum value and a carry value, wherein the circuitry provides the carry-out bit from the first carry-save adder at a first output and the carry value from the modified carry-save adder at a second output,
   wherein each of the propagate, kill, and generate recoded number representations, including the first, second, and third propagate, kill, and generate recoded number representations, has a respective kill bit, a respective propagate bit, and a respective generate bit that are indicative of a respective coded logical value having a plurality of bits, wherein the kill bit, if set, indicates that each of the bits of the respective coded logical value is not set, wherein the propagate bit, if set, indicates that only one of the bits of the respective coded logical value is set, and wherein the generate bit, if set, indicates that each of the bits of the respective coded logical value is set.

2. The apparatus of claim 1, wherein said sum value and said carry value are dual rail encoded values.

3. The apparatus of claim 1, wherein the sum value is a function of the propagate bit of the third propagate, kill, and generate recoded number representation and the carry-in value.

4. The apparatus of claim 3, wherein the sum value is the XOR combination of the propagate bit of the third propagate, kill, and generate recoded number representation and the carry-in value.

5. The apparatus of claim 1, wherein the carry value is a function of the propagate bit of the third propagate, kill, and generate recoded number representation, the carry-in value, and the generate representation.

6. The apparatus of claim 5, wherein the carry value is the OR combination of the generate representation with the AND combination of the propagate bit of the third propagate, kill, and generate recoded number representation and the carry-in value.

7. The apparatus of claim 1, wherein the carry-out value is a function of the generate bit of the first propagate, kill, and generate recoded number representation and the generate bit of the second propagate, kill, and generate recoded number representation.

8. The apparatus of claim 7, wherein the carry-out value is the OR combination of the generate bit of the first propagate, kill, and generate recoded number representation and the generate bit of the second propagate, kill, and generate recoded number representation.

9. The apparatus of claim 1, wherein the circuitry provides the sum value at a third output.

10. The apparatus of claim 1, wherein only a respective one of the kill, propagate, and generate bits of each possible propagate, kill, and generate recoded number representation can be set.

11. The apparatus of claim 1, wherein each set bit of the logical value has a binary value of one.

12. The apparatus of claim 1, wherein the first carry save adder is configured to set only a respective one of the propagate, kill and generate bits of the third propagate, kill, and generate recoded number representation for each possible state of the first and second propagate, kill, and generate recoded number representations.

13. A method for processing propagate, kill, and generate representations of respective first and second binary operands, comprising:
    receiving a carry-in value and a first and a second propagate, kill, and generate representation of respective first and second binary operands;
    generating a third propagate, kill, and generate representation and a carry-out value responsive to the first and second propagate, kill, and generate representations;
    logically combining the third propagate, kill, and generate representation with the carry-in value to generate a sum value and a carry value; and
    providing the carry-out value, the carry value, and the sum value as a result of the addition of the first and second propagate, kill, and generate representations,
    wherein each of the propagate, kill, and generate recoded number representations, including the first, second, and third propagate, kill, and generate representations, has a respective kill bit, a respective propagate bit, and a respective generate bit that are indicative of a respective coded logical value having a plurality of bits, wherein the kill bit, if set, indicates that each of the bits of the respective coded logical value is not set, wherein the propagate bit, if set, indicates that only one of the bits of the respective coded logical value is set, and wherein the generate bit, if set, indicates that each of the bits of the respective coded logical value is set.

14. The method of claim 13, wherein said step of logically combining comprises adding the third propagate, kill, and generate representation and the carry-in value.

15. The method of claim 13, wherein said step of logically combining further comprises generating dual rail encoded values.

16. The method of claim 13, wherein said step of logically combining comprises a XOR combination of the propagate bit of the third propagate, kill, and generate recoded number representation and the carry-in value.

17. The method of claim 13, wherein said step of logically combining comprises an OR combination of the generate bit of the third propagate, kill, and generate recoded number representation with the AND combination of the propagate bit of the third propagate, kill, and generate recoded number representation and the carry-in value.

18. The method of claim 13, wherein said step of generating comprises an OR combination of the generate bit of the first propagate, kill, and generate recoded number representation and the generate bit of the second propagate, kill, and generate recoded number representation.

19. The method of claim 13, wherein each set bit of the logical value has a binary value of one.

20. The method of claim 13, wherein only a respective one of the kill, propagate, and generate bits of each possible propagate, kill, and generate recoded number representation is set.

21. An apparatus for performing addition, said apparatus comprising:
    a first carry save adder configured to receive a first operand defining a first logical value encoded in propagate, kill, and generate (PKG) form such that the operand has a propagate bit, a generate bit, and a kill bit, the first carry save adder configured to receive a second operand defining a second logical value encoded in PKG form such that the second operand has a propagate bit, a generate bit, and a kill bit, the first carry save adder further configured to sum the first and second operands in PKG form to provide a first sum output in PKG form and a first carry bit without decoding the first and second operands from PKG form, the first sum output having a propagate bit, a generate bit, and a kill bit,
    wherein the first carry bit and the propagate, generate, and kill bits of the first sum output collectively represent a summation of the first and second operands, wherein the first sum output represents a third logical value encoded in PKG form and equal to a sum of the first and second logical values, wherein the first logical value has a plurality of bits, wherein the kill bit of the first operand, if set, indicates that none of the bits of the first logical value are set, wherein the propagate bit of the first operand, if set, indicates that only one of the bits of the first logical value is set, and wherein the generate bit of the first logical value, if set, indicates that each of the bits of the first logical value is set, wherein the second logical value has a plurality of bits, wherein the kill bit of the second operand, if set, indicates that none of the bits of the second logical value are set, wherein the propagate bit of the second operand, if set, indicates that only one of the bits of the second logical value is set, and wherein the generate bit of the second logical value, if set, indicates that each of the bits of the second logical value is set, wherein the third logical value has a plurality of bits, wherein the kill bit of the first sum output, if set, indicates that none of the bits of the third logical value are set, wherein the propagate bit of the first sum output, if set, indicates that only one of the bits of the third logical value is set, and wherein the generate bit of the first sum output, if set, indicates that each of the bits of the third logical value is set.

22. The apparatus of claim 21, wherein the first carry save adder is configured to set only a respective one of the kill, propagate, and generate bits of the first sum output regardless of the logical values defined by the operands.

23. The apparatus of claim 21, further comprising a second carry save adder configured to receive a second carry bit and the first sum output of the first carry save adder, the second carry save adder configured to sum the first sum output and the second carry bit to provide a second sum output having a third carry bit and a sum bit.

24. The apparatus of claim 23, wherein the third carry bit is the OR combination of the generate bit of the first sum output with the AND combination of the propagate bit of the first sum output and the second carry bit.

* * * * *

UNITED STATES PATENT AND TRADEMARK OFFICE
CERTIFICATE OF CORRECTION

PATENT NO. : 7,231,414 B1 Page 1 of 1
APPLICATION NO. : 09/501045
DATED : June 12, 2007
INVENTOR(S) : Glen T Colon-Bonet

It is certified that error appears in the above-identified patent and that said Letters Patent is hereby corrected as shown below:

In column 6, line 65, in Claim 5, after "generate" insert -- bit of the third propagate, kill, and generate recoded number --.

In column 6, line 67, in Claim 6, after "generate" insert -- bit of the third propagate, kill, and generate recoded number --.

Signed and Sealed this

Twenty-sixth Day of August, 2008

JON W. DUDAS
*Director of the United States Patent and Trademark Office*